(12) United States Patent
Sharp (10) Patent No.: US 8,567,439 B2
(45) Date of Patent: Oct. 29, 2013

(54) FLOW DIVIDER FOR HYDRAULIC CIRCUITS

(76) Inventor: Rodney Warwick Sharp, Hamilton (NZ)

( * ) Notice: Subject to any disclaimer, the term of this patent is extended or adjusted under 35 U.S.C. 154(b) by 633 days.

(21) Appl. No.: 12/531,334

(22) PCT Filed: Mar. 17, 2008

(86) PCT No.: PCT/NZ2008/000061
§ 371 (c)(1),
(2), (4) Date: Jul. 29, 2010

(87) PCT Pub. No.: WO2008/111863
PCT Pub. Date: Sep. 18, 2008

(65) Prior Publication Data
US 2010/0282348 A1 Nov. 11, 2010

(30) Foreign Application Priority Data
Mar. 15, 2007 (NZ) ........................... 553895

(51) Int. Cl.
*F16K 11/02* (2006.01)
(52) U.S. Cl.
USPC .............................. 137/625.13; 137/614.16
(58) Field of Classification Search
USPC ............. 137/625.11, 625.12, 625.13, 614.16, 137/614.17
See application file for complete search history.

(56) References Cited

U.S. PATENT DOCUMENTS

| | | | |
|---|---|---|---|
| 3,406,703 A * | 10/1968 | Gordon | 137/99 |
| 3,650,295 A * | 3/1972 | Smith | 137/614.17 |
| 3,773,078 A * | 11/1973 | Suntheimer | 137/625.11 |
| 4,553,566 A | 11/1985 | Barclay et al. | |
| 6,681,805 B2 | 1/2004 | McLane et al. | |
| 6,688,333 B2 | 2/2004 | McLane et al. | |
| 6,923,211 B2 | 8/2005 | McLane et al. | |
| 6,976,505 B2 | 12/2005 | McLane et al. | |
| 7,131,460 B2 | 11/2006 | McLane et al. | |
| 2003/0098077 A1 | 5/2003 | McLane et al. | |
| 2003/0106595 A1 | 6/2003 | McLane et al. | |
| 2004/0108006 A1 | 6/2004 | McLane et al. | |
| 2006/0054223 A1 | 3/2006 | Baumgarten et al. | |

FOREIGN PATENT DOCUMENTS

EP 0 545 486 9/1993

OTHER PUBLICATIONS

International Search Report—PCT/NZ2008/000061—Jul. 4, 2008.

\* cited by examiner

*Primary Examiner* — John Rivell
*Assistant Examiner* — Kevin Barss
(74) *Attorney, Agent, or Firm* — Young & Thompson (57) ABSTRACT

A rotary flow divider, particularly for use in hydraulic circuits for applications such as dividing the output of a hydraulic pump between several differently (non-equally) loaded devices. Includes a central distributor which channels fluid from the pump to outlet ports, and an outer housing with a plurality of distribution ports (associated with different loaded devices). Repeated alignment and closure of outlet and distribution ports in a sequential type manner distributes fluid to the different devices. Such port alignment and closure is achieved by movement of the distributor and housing relative to each other in a rotational and/or linear manner, though an intermediary moving shutter device or sleeve may be used instead. Such an intermediary shutter device or sleeve may also be configured as a repositionable control sleeve to modify the nature of distribution of fluid when it is secured in different positions.

14 Claims, 6 Drawing Sheets

FLOW DIVIDER FOR HYDRAULIC CIRCUITS

FIELD OF INVENTION

The present invention is directed to apparatus for dividing the output from a pump into a plurality of outputs suitable for feeding different devices.

BACKGROUND DESCRIPTION

The present invention was developed with the issues associated with using one hydraulic pump to drive multiple devices. While this appears to be simply resolved by splitting a pump's output line into several, so that there is one line feeding each device, the actual solution is not so simple. In an ideal situation where each device was perfectly identical, and the load on each device was equal and constant, this might work. However, in real and practical terms it is impossible for two identical devices to be actually identical in every way (or to remain so due to wear, etc.). Similarly it is rare for loads to remain constant and equal on each circuit. There is also the situation that the user may wish to drive different types of devices off the same pump.

One solution used in the art is to use a 'flow divider', which is a pressure compensated flow control valve which typically splits an input flow into two output flows. The output flows can be set up to be equal, or to differ from each other by a predetermined ratio. However, there are problems associated with these devices. For instance they tend to operate to maintain flow control within a narrow range, rather than at one particular predetermined point. Hence they are only useful where variations within a range of limits (depending on the device in a particular situation) is acceptable.

Where a higher degree of control is required, a rotary flow divider is used. This comprises a linked series of hydraulic motors fed from a common input. There is no load on each of the hydraulic motors, and there is one motor for each required output. It is assumed that the flow of hydraulic fluid through each (identical) motor rotating at the same speed (which they must be because they are linked) is identical. Hence on the output side of each motor is an equal flow of hydraulic fluid.

While effective in many situations, rotary flow dividers suffer one particular problem—intensification. Assume there are a plurality of motors in the rotary flow divider each feeding a device under load. Now assume that the load on one (or more) of the devices attached to a motor reduces or drops to zero. The full differential hydraulic pressure will then be applied to the other motors. What then happens is that these motors start acting as pumps and drive their connected devices much harder than they should. The rotary flow divider then fails as a device for equally distributing a hydraulic output to multiple circuits.

Another disadvantage of the rotary flow divider, apart from the need for one motor for each circuit, is that they are generally unsuitable for low fluid flow rates. Rotary flow dividers typically work best at around 1500 rpm minimum. Given that the typical minimum size of available hydraulic motors (suitable for use therein) is around 1 cc (cubic centimetre) we have a minimum flow rate of around 1.5 liters/minute per circuit, which is too high for many applications.

Accordingly there is a need to provide an improved device for predictably dividing a fluid output, such as a hydraulic output, into several circuits.

Accordingly, it is an object of the present invention to address the above problems.

It is a further object of the present invention to provide flow dividing apparatus suitable for use in a hydraulic circuit.

At the very least it is an object of the present invention to provide the public with a useful alternative choice.

Aspects of the present invention will be described by way of example only and with reference to the ensuing description.

GENERAL DESCRIPTION OF THE INVENTION

According to one aspect of the present invention there is provided a fluid flow divider comprising a central distributor having axial length; the central distributor including an axial conduit connecting at least two axially separated radial conduits extending to an outside surface of the distributor;

at least one of said radial conduits being an input conduit and the other(s) being output conduit(s); the central distributor being positioned within an outer distribution housing; the outer distribution housing having a plurality of independent circuit conduits positioned such that periodically during operation of the fluid flow divider, they are open to communication with an output conduit of the central distributor for an interval of time;

each independent circuit conduit leading to an outer surface of the distribution housing for connection to a circuit requiring a divided flow output;

there also being provision for the connection of a fluid input to an input conduit of the central rotating distributor.

According to another aspect of the present invention there is provided a fluid flow divider, substantially as described above, in which the opening of an independent circuit conduit to an output conduit of the central distributor is achieved by rotation of either or both of the central distributor or outer distribution housing relative to the other, such that the openings of said conduits overlap for a said interval of time during their relative rotation.

According to another aspect of the present invention there is provided a fluid flow divider, substantially as described above, in which the opening of an independent circuit conduit to an output conduit of the central distributor is achieved by a shutter arrangement between facing openings of said conduits, said shutter arrangement comprising a movable shutter element positioned such that movement of the movable shutter element allows said conduit flow aperture to be positioned to either allow the flow of fluid between said conduits, or to block fluid flow between said conduits.

According to another aspect of the present invention there is provided a fluid flow divider, substantially as described above, in which the movable shutter element comprises a sleeve positioned between the central distributor and the outer distribution housing.

According to another aspect of the present invention there is provided a fluid flow divider, substantially as described above, in which the movable shutter element is capable of relative motion to the central distributor and outer distribution housing by either or both of i) rotation, or ii) a periodic linear sliding movement.

According to another aspect of the present invention there is provided a fluid flow divider, substantially as described above, in which there are a plurality of movable shutter elements, each with at least one conduit flow aperture and movable by a periodic linear sliding movement to open or block fluid flow between an independent circuit conduit and an output conduit of the central distributor.

According to another aspect of the present invention there is provided a fluid flow divider, substantially as described above, in which the periodic linear sliding movement of a movable shutter element is controlled by a rotating cam arrangement.

According to another aspect of the present invention there is provided a fluid flow divider, substantially as described above, in which the closing of an output conduit to an independent circuit conduit overlaps with the opening of an output conduit to an independent circuit conduit.

According to another aspect of the present invention there is provided a fluid flow divider, substantially as described above, in which, at all times during normal operation, the axial conduit of the central distributor is, via the output conduits, at least partially open to one or more independent circuit conduits.

According to another aspect of the present invention there is provided a fluid flow divider, substantially as described above, in which either or both of i) the opening of an output conduit to an independent circuit conduit, or ii) the closing of an output conduit to an independent circuit conduit, is progressive.

According to another aspect of the present invention there is provided a fluid flow divider, substantially as described above, in which the progressive opening and/or closing in achieved by modifying the shape of one or more of the openings which overlap to affect opening and closing of an output conduit to an independent circuit conduit.

According to another aspect of the present invention there is provided a fluid flow divider, substantially as described above, in which either or both of a leading edge, or trailing edge, of an opening is shaped according to one or more of the following configurations: teardrop, triangular, oval, circular, parabolic, crescent shaped, or a complex shape made up of a combination of one or more of the preceding shapes.

According to another aspect of the present invention there is provided a fluid flow divider, substantially as described above, in which there are multiple output conduits in the central distributor which are arranged in a radial pattern and distributed, either regularly or non-regularly, substantially within the same radial plane.

According to another aspect of the present invention there is provided a fluid flow divider, substantially as described above, in which there are multiple output conduits which are arranged radially in different radial planes, a radial plane being a plane perpendicular to the rotational axis of the central rotating distributor.

According to another aspect of the present invention there is provided a fluid flow divider, substantially as described above, in which an input conduit is arranged to extend radially to a side surface of the central distributor.

According to another aspect of the present invention there is provided a fluid flow divider, substantially as described above, in which the outer distribution housing has a fluid feed conduit able to deliver fluid to said input conduit of the central distributor.

According to another aspect of the present invention there is provided a fluid flow divider, substantially as described above, in which the fluid feed conduit delivers fluid to a circumferential channel on the inner surface of the outer distribution housing, and which channel overlaps with the opening of said input conduit to the outside surface of the central distributor.

According to another aspect of the present invention there is provided a fluid flow divider, substantially as described above, in which there are multiple input conduits in the central distributor.

According to another aspect of the present invention there is provided a fluid flow divider, substantially as described above, in which an input conduit on the central distributor ports to an axial surface of the central rotating distributor, an axial surface being a surface (or part of a complex surface) through which the rotational axis of the distributor passes.

According to another aspect of the present invention there is provided a fluid flow divider, substantially as described above, in which each independent circuit conduit leads to an outer surface of the outer distributor housing for communication with a fluid circuit requiring its output.

According to another aspect of the present invention there is provided a fluid flow divider, substantially as described above, in which there are fluid check valves associated with one or more independent circuit conduits.

According to another aspect of the present invention there is provided a fluid flow divider, substantially as described above, in which there is a repositionable control sleeve between the central distributor and housing, and in which the repositionable control sleeve is able to be positioned between a number of pre-selected positions, and held in a said position during operation of the fluid flow divider;
and wherein, said repositionable control sleeve possesses apertures therein which, when in different pre-selected positions, interact with either or both of at least one aperture port of the output conduit(s), or at least one aperture port of an independent circuit conduit of the housing, such that the flow of fluid between said aperture ports is controlled according to at least one of: closing off a said aperture during operation of the fluid flow divider, opening up a said aperture during operation of the fluid flow divider, and increasing the effective duration of opening of aperture during operation of the fluid flow divider.

According to another aspect of the present invention there is provided a fluid flow divider, substantially as described above, in which the apertures in the control sleeve modify the available openings of one or more ports associated with independent circuit conduits in the housing.

According to another aspect of the present invention there is provided a fluid flow divider, substantially as described above, in which the control sleeve is repositionable by either or both of: a rotational action, or a sliding action.

According to a further aspect of the present invention there is provided a fluid flow divider comprising a central rotating distributor having axial length; the central rotating distributor including an axial conduit connecting at least two axially separated radial conduits extending to an outside surface of the distributor;
at least one of said radial conduits being an input conduit and the other(s) being output conduits;
the central rotating distributor able to rotate within an outer distribution housing; the outer distribution housing having a plurality of independent circuit conduits positioned such that they are communication with an output conduit of the central rotating distributor for at least part of the period of the distributor's rotation within the housing;
each independent circuit conduit leading to an outer surface of the distribution housing for connection to a circuit requiring a divided flow output;
there also being provision for the connection of a fluid input to an input conduit of the central rotating distributor.

According to another aspect of the present invention there is provided a fluid flow divider, substantially as described above, in which the central rotating distributor is cylindrical or is a more complex design appearing to substantially comprise portions which are each substantially cylindrical.

According to another aspect of the present invention there is provided a fluid flow divider, substantially as described above, in which the outer distribution housing has an internal configuration commensurate to the shape of the central rotating distributor and allows the latter to rotate substantially freely, under no load, within.

According to another aspect of the present invention there is provided a fluid flow divider, substantially as described above, in which an output conduit is substantially a straight channel leading from the axial conduit to the side surface of the central rotating distributor, the side surface being a surface which the axis of rotation of the distributor does not pass through.

According to another aspect of the present invention there is provided a fluid flow divider, substantially as described above, in which there are multiple output conduits which are arranged in a radial pattern distributed, either regularly or non-regularly, substantially within the same plane.

According to another aspect of the present invention there is provided a fluid flow divider, substantially as described above, in which there are multiple output conduits which are arranged radially in different radial planes, a radial plane being a plane perpendicular to the rotational axis of the central rotating distributor.

According to another aspect of the present invention there is provided a fluid flow divider, substantially as described above, in which an input conduit is arranged to extend radially to a side surface of the central rotating distributor.

According to another aspect of the present invention there is provided a fluid flow divider, substantially as described above, in which the aperture created where an output conduit meets the outer surface of the central rotating distributor is non circular.

According to another aspect of the present invention there is provided a fluid flow divider, substantially as described above, in which the aperture created where an output conduit meets the outer surface of the central rotating distributor is substantially at least one of the following shapes: oval, tear-dropped, triangular, rectangular, a parallelogram, a quadrilateral, crescent shaped, or a complex shape made up of a combination of one or more of the preceding shapes.

According to another aspect of the present invention there is provided a fluid flow divider, substantially as described above, in which the outer distribution housing has a fluid feed conduit able to deliver fluid to an input conduit during at least part of the period of rotation of the central rotating distributor within the outer distribution housing.

According to another aspect of the present invention there is provided a fluid flow divider, substantially as described above, in which the outer distribution housing has a fluid feed conduit able to deliver fluid to an input conduit during the entire period of rotation of the central rotating distributor within the outer distribution housing.

According to another aspect of the present invention there is provided a fluid flow divider, substantially as described above, in which the fluid feed conduit delivers fluid to a circumferential channel on the inner surface of the outer distribution housing, and which channel overlaps with the opening of an input conduit to the outer side surface of the central rotating distributor.

According to another aspect of the present invention there is provided a fluid flow divider, substantially as described above, in which there are multiple input conduits in the central rotating distributor.

According to another aspect of the present invention there is provided a fluid flow divider, substantially as described above, in which different conduits of the multiple input conduits are fed by different fluid feed conduits.

According to another aspect of the present invention there is provided a fluid flow divider, substantially as described above, in which an input conduit on the central rotating distributor ports to an axial surface of the central rotating distributor, an axial surface being a surface (or part of a complex surface) through which the rotational axis of the distributor passes.

According to another aspect of the present invention there is provided a fluid flow divider, substantially as described above, in which an axially ported input conduit comprises means for connecting to a fluid feed.

According to another aspect of the present invention there is provided a fluid flow divider, substantially as described above, in which the fluid feed comprises a fluid feed conduit within the outer distribution housing.

According to another aspect of the present invention there is provided a fluid flow divider, substantially as described above, in which each independent circuit conduit leads to an outer surface of the outer distributor housing for communication with a fluid circuit requiring its output.

According to another aspect of the present invention there is provided a fluid flow divider, substantially as described above, in which there are fluid check valves associated with one or more independent circuit conduits.

Embodiments of the present invention typically have a central distributor, which distributes fluid to an outer housing. This arrangement, in which the distributor is central and the housing is substantially about the distributor (when viewed along the long axis of the distributor) tends to be convenient and simple to implement. While other arrangements are possible, for simplicity the remainder of the description (unless otherwise noted) will refer to a typical arrangement with the housing positioned about a central distributor.

Fluid flow dividers according to the present invention may enjoy different specific designs according to the principles discussed herein. However it is envisaged that each will be based around the general principle of a distributor portion interacting with a housing portion. The general principle will involve the opening and closing of conduits to control flow to the separate independent output circuits (called 'independent circuit conduits' herein). This opening and closing will be achieved ideally by the movement of at least one element of the flow divider assembly relative to another, and typically by a rotational and/or periodic linear motion. Through such actions the ports of the output conduit(s) in a central distributor will be progressively opened and closed to ports associated with independent circuit conduit(s) in the housing portion. Typically, for a particular circuit comprising input and outputs (single apparatus according to the invention may comprise one or a plurality of separate input and output sets), the input will typically only be open to one outlet (or set of outlets feeding a single device coupled to the apparatus) at a time though variations exist in which there is some progressive overlap between consecutively closing and opening apertures in a set.

In some embodiments such opening and closing may be achieved by effecting relative rotation between the central distributor, and the outer housing. As relative rotation progresses, output conduit port apertures in the central distributor progressively align and become unaligned with the port apertures of independent circuit conduits in the outer housing portion. As a variation the central distributor could act like a piston, with a periodic cyclic linear sliding motion, in which the port apertures of the conduits align and become unaligned repeatedly.

As a variation to the above, a shutter arrangement can be employed. In its simplest form, this may be a sleeve between the central distributor and outer housing. This sleeve contains apertures which align (and become unaligned) with matching conduit openings (i.e. the port apertures of the output conduits of the central distributor and independent circuit conduits of the housing) to control flow therebetween. The sleeve may rotate relative to the distributor and housing, or undergo a periodic cyclic linear sliding motion in relation thereto. The sleeve may also be substituted by other elements performing a shutter like action—for instance, if the central distributor was polygonal then multiple shutter plates could be substituted for a sleeve.

In each of the above cases there is a repeated alignment, and unalignment, of port aperture openings to control fluid flow from the central distributor to housing. The principle remains the same, though (as can be seen) there are several possible mechanical arrangements for implementing the common principle.

Discussing the rotating distributor to outer housing arrangement, it is envisaged that the preferred embodiment (as typically being easier to construct) will have a centrally rotating distributor within a stationary outer housing. Variations are envisaged however—for instance the housing may physically rotate while the distributor is stationary (though relative rotation of one to the other is still achieved), and this is within the envisaged scope of the present invention. Similarly both elements may rotate, still achieving rotation relative to each other. Again this is envisaged within the scope of the present invention. The important feature is that there is relative rotation of one element with respect to the other. Hence the term 'rotating' where used herein generally means 'rotating relative to the other component(s) with which it interacts'.

In the alternative embodiment where a repeating linear sliding motion between distributor and housing is employed, again the importance is on relative motion—either of the distributor or housing may move while the other is stationary, or both may move. The same general principles exist, except that a point on the outside of the distributor moves linearly in an axial direction (or parallel to axial direction) rather than rotationally about the central long axis. In a purely linear embodiment the orientation and distribution of the aperture ports on the distributor and housing may differ—where they may be circumferentially distributed about the outer housing in a rotating embodiment, they would typically be axially distributed in a linear embodiment. As mentioned before, the general principle of overlapping aperture ports to allow flow (or obscure them to cease flow) by movement of the distributor relative to the housing, remains the same.

It has been previously mentioned that shutter arrangements may be employed. These are simply moving elements, which may move in the manner of the rotational and/or axial linear methods described above. Again they will operate on the same principle of overlapping port apertures to allow flow (or to obscure them to cease flow), in this case by their movement relative to the housing and distributor.

Shutters may also provide an additional role, as will be described in more detail later. In this additional role the distributor and/or housing move relative to each other. For simplicity, let us take the example where the housing is stationary and the distributor rotates. The shutter also remains stationary during operation of the apparatus, but is selectable in position between one or more preferred positions, into which it may be held or locked. Moving between these positions may be by either or both of rotation or linear sliding of the shutter arrangement (which in this example is a sleeve). In each position, the position, shape, and/or number of apertures presented to the port apertures of the distributor and housing differ. For instance, with the shutter arrangement in position A, a particular port combination between the distributor and housing may be open for 1/3 of a rotational period (e.g. 120°). In position B this may be reduced to 45° or 1/8 of a rotation. In position C the port may not be opened at all (but another port might). This opens a wide range of options, to allow a single piece of apparatus to operate in a variety of ways. As mentioned before, this will be discussed in more detail later in the examples.

Where shutters are employed (in this section, for simplicity, we shall assume the shutter arrangement can not be moved between different positions to alter port operation as per the preceding paragraphs), one or more shutter elements may be employed though a sleeve between the central distributor and outer housing is perhaps the simplest to implement (and describe). The shutter element(s) will typically move relative to a stationary distributor and housing, though the distributor and housing could also move relative to a stationary shutter element(s). Both rotational and linear sliding movements of the shutter relative to distributor/housing combination are possible. Linear sliding motions can be implemented by a number of methods, including the use of a cam or crank to drive the shutter element(s).

As previously mentioned, embodiments of the present invention typically have a central distributor, which distributes fluid to an outer housing. This arrangement, in which the distributor is central and the housing is substantially about the distributor (when viewed along the long axis of the distributor) tends to be convenient and simple to implement. While other arrangements are possible, for simplicity the remainder of the description (unless otherwise noted) will refer to a typical arrangement with the housing positioned about a central distributor.

The central distributor is effectively means for feeding fluid from an input (such as a pump) to an output. Typically the inputs and outputs are separated axially—axially being with reference to the (relative) long or rotational axis of the central distributor. This enables the distributor to take fluid from an input and feed it to a plurality of outputs. While other arrangements are possible where said input and output are not separated axially, these will tend to be limited to arrangements in which there is linear rather than rotational motion of the moving elements of the apparatus, and will often be more difficult to implement.

The distributor leads a fluid input to an output conduit which, during operation of the apparatus, connects substantially sequentially to a plurality of independent circuit conduits to which fluid operated devices can be attached. Axially separating the input and output conduits is an effective and simple way of achieving this.

The input conduit may extend radially outwardly to an outer side surface of the distributor. In the case of the distributor having the preferred shape of a cylinder (at least in the portion where the input conduit is situated) the side surface means the curved surface of a cylinder. Here it may interact with one or more feed ports though preferably the input conduit overlaps with a channel in the outer housing to which a fluid feed conduit leads. This ensures, for embodiments in which the distributor rotates relative to the outer housing, that the input conduit is in continuous communication with the channel during the entire rotation of the distributor.

It should also be envisaged that such a channel may also be provided on the distributor to provide continuous feed to the input conduit during rotation. Hence, such a channel may be provided on either or both of the distributor and housing.

For an embodiment in which the distributor moves in a linear fashion relative to the outer housing, a channel may still be provided in either or both of the distributor and housing for the transfer of input fluid. However, in this case, the orientation of any channels will tend to be parallel to the direction of linear movement of the distributor/housing (rather than circumferential or part circumferential as for a rotating relative movement between the distributor and housing).

For embodiments employing a moving (relative to distributor/housing) sleeve or shutter to control flow, any channel may instead be formed within the sleeve or shutter. The orientation of the channel will reflect the direction of its movement—i.e. for a rotating shutter/sleeve the channels would tend to be fully or part circumferential, while for linear movement embodiments the channels would parallel the direction of linear movement.

Alternatively, or additionally, an input conduit may lead to an axial end of the distributor and be connected to a fluid feed conduit—which may be part of the outer housing or an independent line connected to the input conduit—so as to provide a feed of fluid to the device.

It should be envisaged that variations of the above examples exist. For instance, one fluid distribution circuit may have multiple input conduits. These may afford a user a choice in how an external feed device, such as a pump, is connected. It may also allow for the connection of multiple fluid sources, and optionally means for selecting between multiple sources. Hence for a proportion of one rotation (or linear cycle) the input may connect to one pump, then to another pump for another proportion of a rotation (or linear cycle). This is a way of using multiple pumps on a single fluid distribution circuit. In such embodiments, typically the central distributor will have a radially directed input conduit and port, with multiple ports present in the outer housing where each of said multiple ports is connectable to a separate pump or fluid supply source.

It should also be noted that there may also be multiple and separate fluid distribution circuits within the distributor, each comprising its own set of input conduits, output conduits, and axial conduit links. This allows complex devices to be built compactly. Such multiple distribution circuit embodiments merely involve a replication of a single distribution circuit (with inputs and outputs) and will not be discussed more fully here—it is envisaged that their manufacture will be clear to a skilled workman in light of the description given herein. For simplicity, the description herein will refer to embodiments with a single distribution circuit, unless otherwise stated.

The output distribution portion generally comprises at least one output conduit within the distributor which leads to an outer surface thereof. This should ideally be the side, non-axial, surface of the distributor (assuming the preferred (but not necessary in all embodiments) cylindrical shape in the region of the output conduit(s)). The port aperture(s) of the output conduit(s) functionally overlap with the port aperture(s) of independent circuit conduits within the housing for short (depending on design) periods during the relative movement of the distributor to the housing, or the opening of shutters/sleeve apertures in such embodiments. During this period of overlap/opening fluid is fed from the output conduit (which is in communication with the fluid source or pump) into the independent circuit conduit and thus to any connected device. Ideally, during this period of fluid transfer, only a single independent circuit conduit is in communication with an output conduit (per distribution circuit—i.e. for embodiments in which there are multiple distribution circuits each comprising an input with its own set of outputs (see preceding paragraph)). This prevents any flow back or feedback into any other independent circuit conduit or connected device, though various valves (with added complexity) could be used to address such issues. The arrangement is such that any drop in load in the connected independent circuit conduit cannot fed back so as to drive the flow divider of the present invention as a pump. This avoids the pressure intensification problems of typical rotary flow dividers.

Typically each independent circuit is isolated from the others at any time during rotation, and typically no two circuits are in communication with the feed source/pump at any period during rotation. However, some embodiments do allow for some overlap—as feed to one circuit is progressively tailing off, the feed to one circuit is progressively opening While such principles can be varied in different designs of the present invention, it should be appreciated that in the present invention there is provision for designs which allow for independent distribution of fluid to different circuits with minimal feedback problems affecting other distribution circuits due to different or changing loads on each circuit.

As can be appreciated the nature of the invention is such that feed to each circuit comprises a series of pulsed feed periods, rather than a continuous flow. It is envisaged that in most situations that this is not an issue. If it is then each independent circuit conduit ports to several points around the inside of the housing so that it is fed by an output conduit several times during a single revolution of the distributor, rather than just once, or a channel is machined into one of the opposing faces of the housing and/or distributor so that the open duration is increased.

Port shapes, where the output conduit(s) and independent circuit conduits open out (for overlapping each other during rotation), may also be varied to affect operating characteristics. For instance, in a rotating embodiment, a small port shape might only allow for connection for 2-3° during a revolution of the distributor relative to the housing. An elongated port shape (on either or both interacting conduits) could allow for a longer connection period e.g. 10-90°. Machining or forming grooves into an opposing face of the housing and/or distributor is another way of increasing opening duration, and will be illustrated in the ensuing examples. Port opening duration is a matter of user choice and design, and various connection periods are possible for both rotating and linear sliding embodiments. Where shutters are used, variations in port shape may be applied in any one or more of the distributor, housing and shutter.

Different independent circuits may have different connection times through differing port designs—this allows user choice, and may be useful for connecting different types of devices or for providing outputs with different output characteristics.

Leading edges of ports may take different shapes, such as progressive lead-in configurations to reduce hammering type effects as each port is opened to a circuit. The same may apply to port close off.

Another variation is to overlap timing so that one port is progressively opening as another is progressively closing. This may present a more constant load to the input source or pump. However, it is envisaged that such arrangements will typically require multiple output ports such that one output port is associated with the newly opening independent circuit conduit port and the other output port is associated with the closing independent circuit conduit port. The use of one-way check valves may be desirable in some instances to reduce potential feedback from one circuit to the other, though will also depend on parameters such as the degree of overlap and rotational speed of the distributor, etc. More sophisticated overlapping port timings are possible should the user desire.

Simply, the present invention provides a way of dividing a fluid flow, such as may be used for driving hydraulic devices, with minimal feedback into the system should the parameters of one divided circuit vary or alter. Modifications and variations are envisaged. For instance, one way valves may be provided on an independent circuit port or connected thereto, to further reduce the possibility of feedback into the system.

It should also be appreciated that the user is given a high degree of choice during design of a specific embodiment. For instance, low flow embodiments are possible. A small unit can have conduits of relatively small volume, meaning that the amount of fluid fed during a single revolution can be relatively small. Port timings can further be used to affect flow rates, as well as the relative speed of rotation of the distributor—typically operating speeds in the range of 500-3000 rpm are envisaged, but without excluding speeds outside of this range. A device able to deliver 0.1 cc per revolution is quite feasible, allowing for flow rates as low as 0.05 litres/minute—compare this with the typical minimum flow rate of 1.5 liters/minute for standard rotary flow dividers.

As for maximum flow, this is generally limited by how big a user wishes to build the device, port timing, conduit diameters, etc.

Seals and bearings can be provided between parts, as per common practice. In many cases the small tolerances between moving parts is calculated to allow a fluid film (of the fluid being distributed) to exist between opposing surfaces—this film providing lubrication. Typically, the amount of fluid in this volume between faces is too small to represent a leakage problem should it travel directly between input and output conduits via the volume between the opposing surfaces. This technique, of course, is generally restricted to applications where the fluid possesses some lubricating properties, otherwise other techniques (e.g. bearings) should be considered.

BEST METHODS OF PERFORMING THE INVENTION

Figure 1:
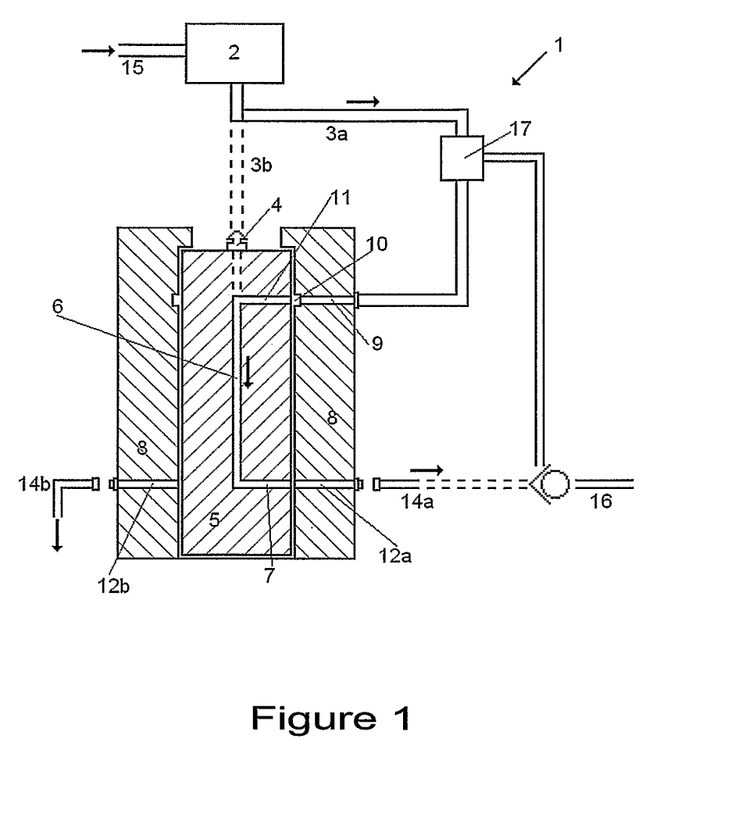
FIG. 1 a cross-sectional side view of a preferred embodiment of the present invention.

With reference to the drawings, and by way of example only, there is illustrated an embodiment of the present invention. FIG. 1 provides a cutaway view, which enables various components of the embodiment to be seen.

EXAMPLE 1

Referring to FIG. 1 there is generally shown an embodiment of a flow divider (generally indicated by arrow 1) which can be fed by a hydraulic pump (2). A feed line (3a, 3b) may deliver fluid from the pump to the divider in two ways. In option (3a) the feed line leads directly to a rotary coupling (4) on an axial surface of the central rotating distributor (5). This leads to the axial conduit (6) which leads to radially directed output conduit (7). Here the input conduit is essentially an extension of the axial conduit (6).

In option (3a) the feed line is coupled to the outer distribution housing (8) and connects to an fluid feed conduit (9). The fluid feed conduit (9) leads to a circumferential channel (10) extending fully about the curved inner surface of the housing (8). The channel (10) aligns with the port of input conduit (11) during the entire revolution of the distributor (5) relative to the housing (8), thereby providing a continuous feed of fluid from the pump to the axial conduit (6) and output conduit (7).

Figure 2:
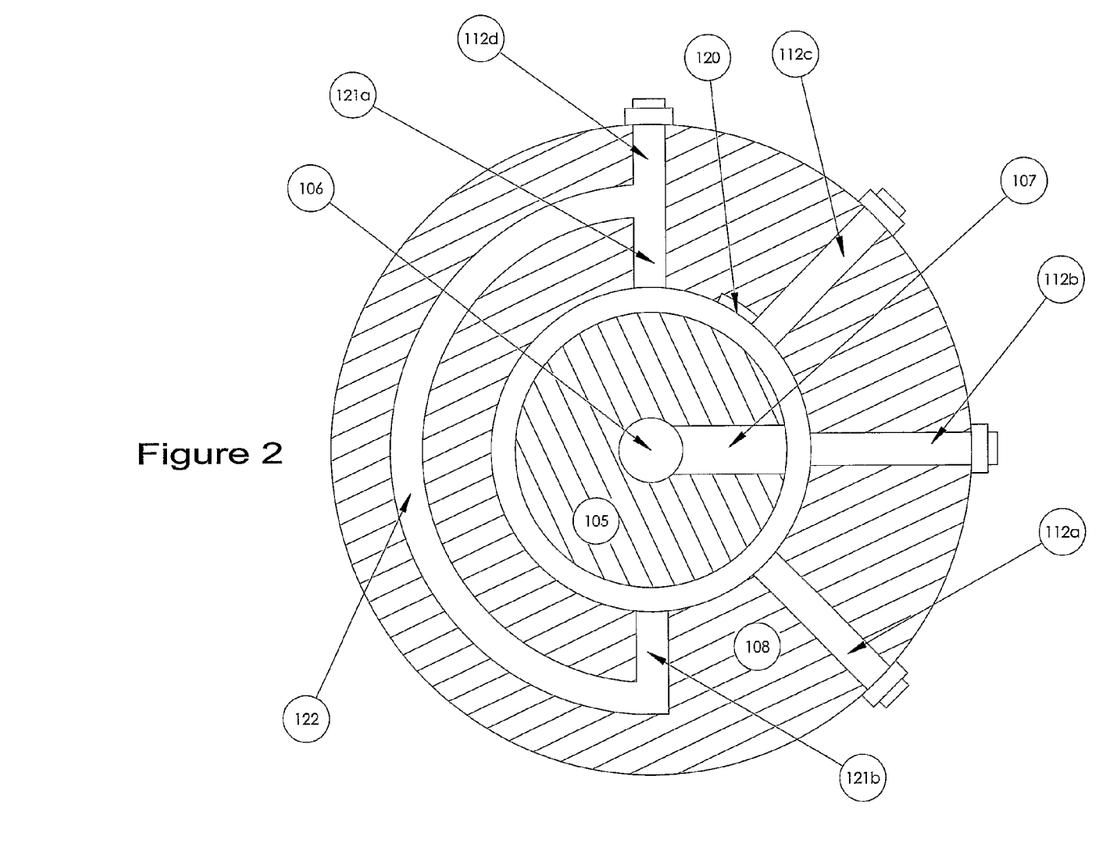
FIG. 2 is a cross-sectional underside view of a variation of the embodiment of FIG. 1.

As the distributor (5) rotates relative to the housing (8), the output conduit (7) successively lines up with a series of radially disposed independent circuit conduits (12a, 12b)—these are better seen in FIG. 2. Accordingly the output conduit (7) feeds each independent circuit conduit (12) sequentially. Each of these conduits is connected to an appropriate feed line (14a, 14b) leading to each connected device. One way check valves (16) may be placed in each line (14).

Returned fluid from the connected devices is returned to the pump at (15).

FIG. 2 is an underside cross-sectional view of a variation of the embodiment of FIG. 1, focusing on the output conduit (107) and its connections. For clarity, certain components associate with the input section of the device have been excluded from FIG. 2.

Visible within the distributor (105) is the axial conduit (106) and the output conduit (107). Here the output conduit (107) is shown aligned with independent circuit conduit (112b). As the distributor (105) rotates clockwise, the next independent circuit conduit to be fed is conduit (112c).

Independent circuit conduit (112a) is a little different in that illustrated is an extended port opening (120) comprising a channel. This allows the conduit (112a) to be fed for a greater rotational period than conduits (112b) or (112c). Another variation is shown in independent circuit conduit (112d) which connects to the inside of the distributor housing (108) at two points (121a, 121b) connected by connecting conduit (122). This allows this independent circuit conduit (112d) to be fed twice per revolution.

These variations may be applied to all or some of the independent circuit conduits (112) and in varying combinations according to user choice and need. Each independent circuit conduit (112) can be coupled to an attached device or circuit.

EXAMPLE 2

Figure 3:
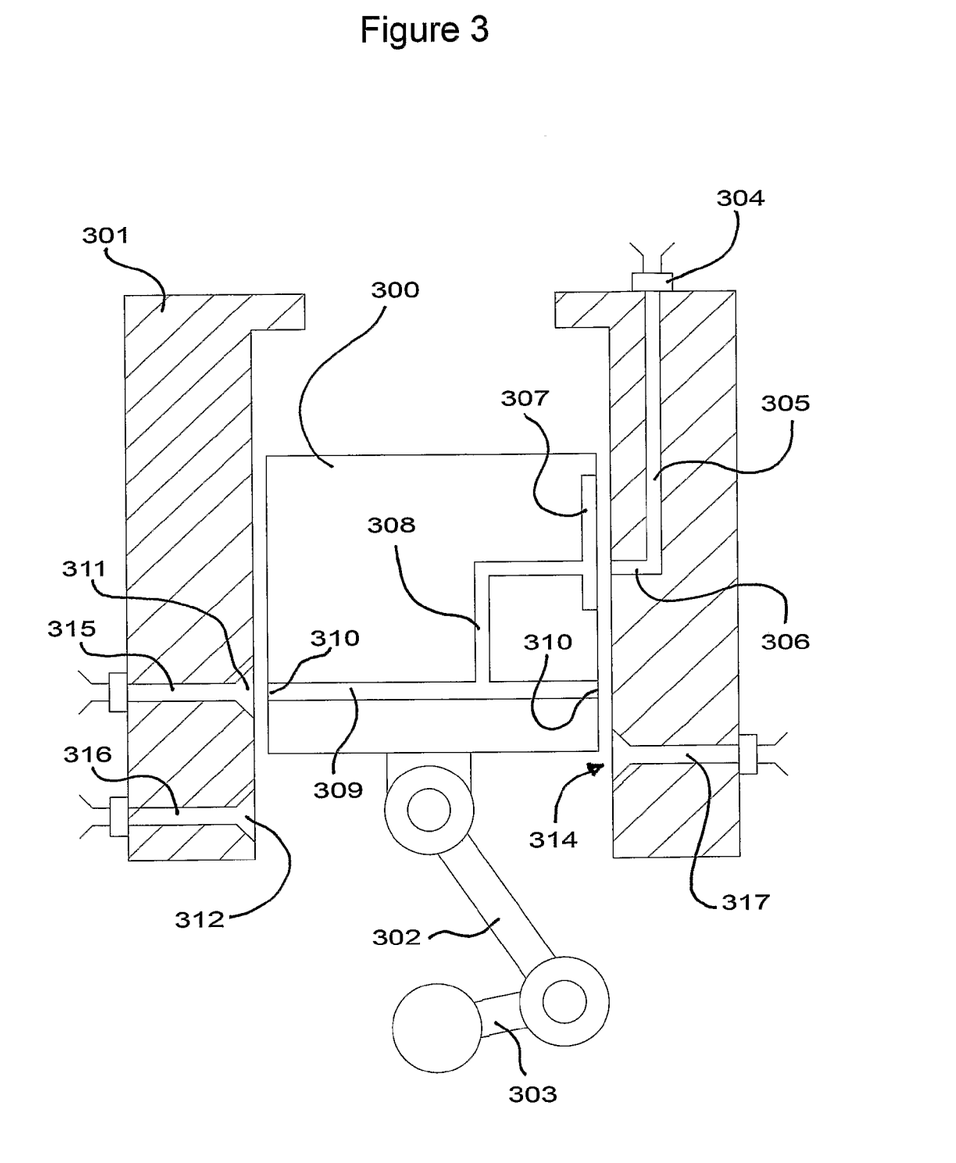
FIG. 3 is a cross-sectional side view of an embodiment in which there is relative linear translation between the distributor and housing, FIGS. 4a, b are cross-sectional side views of an embodiment in which the distributor is rotatably repositionable to select between different output modes.

This example illustrates and embodiment in which the central distributor (300) slides up and down in a repeating linear sliding cycle within the outer housing (301). The periodic motion of the central distributor (300) is achieved by connecting (302) the distributor (300) to a driven rotating crankshaft (303). However, other methods may be used to implement the repetitive linear motion of the distributor (300).

A fluid inlet supply (304) connects to a fluid input conduit (305) in the housing (301). This leads to a housing fluid supply port (306). This overlaps with a distributor fluid inlet port (307) comprising a machined channel, so that the ports (306, 307) overlap during the entire distance of linear motion of the distributor (300). The inlet port (307) is connected to fluid distribution port (308) which feeds to output conduit (309) and associated ports (310). The drawing is two dimensional, though it should be appreciated that there may be less or more than two radially directed arms on the conduit (309) leading to ports (310).

During the linear motion of the distributor (300), the ports (310) will at different periods during the linear motion, overlap with different independent circuit conduit ports (311, 312, 314) and their associated independent circuit conduits (315, 316, 317 respectively). The distributor ports (310) and/or the housing ports (311, 312, 314) may each be simple circular apertures, be elongated, be channels, or adopt various configurations as previously discussed herein.

EXAMPLE 3

Figure 4A:
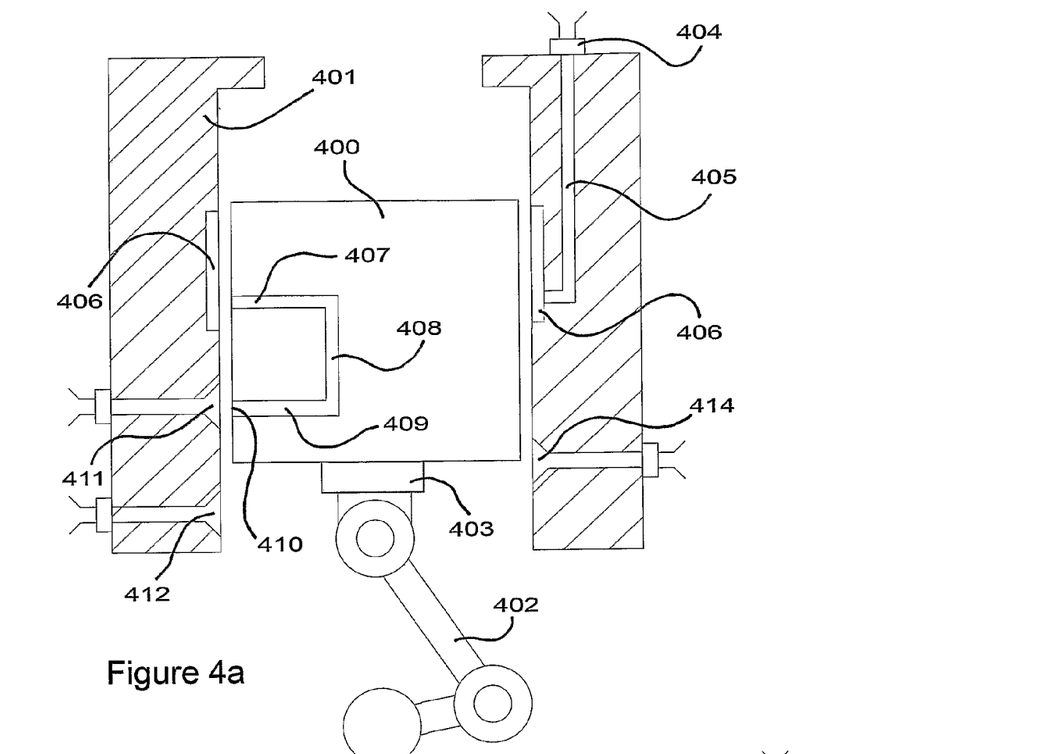
Figure 4B:
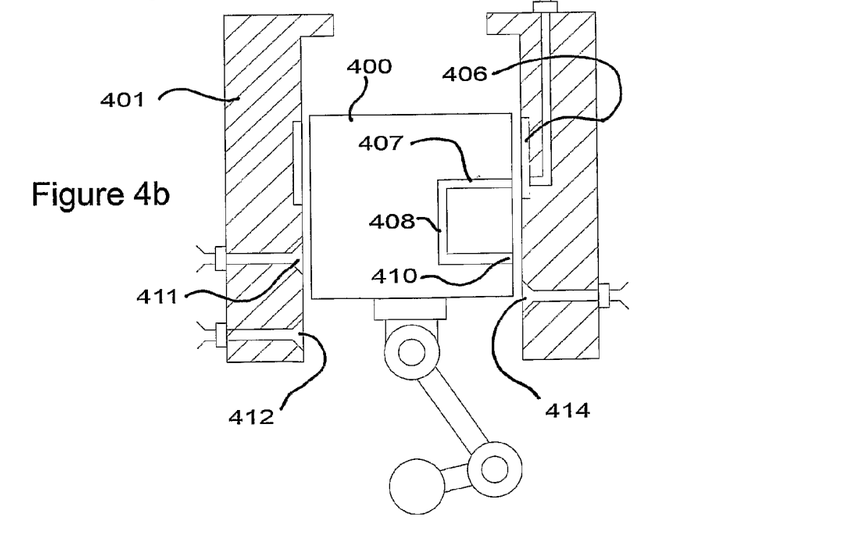

This is a variation of example 2 and is illustrated in FIG. 4. In this example the central distributor (400) is connected to the connecting rod (402) by a rotatable connection (403) enabling the distributor to be rotated about its central axis. The connection (403) allows the distributor to be locked into one of two or more rotational positions—in the illustrations of FIG. 4 there are two possible positions; FIG. 4a illustrates the distributor (400) in one position, and FIG. 4b illustrates the distributor (400) in the alternate position in which it has been rotated 180° about its axis. Various mechanical arrangements are known which allow the distributor to be rotated and locked into position (against further rotation during operation).

In FIG. 4a a fluid inlet supply (404) connects to a fluid input conduit (405) in the housing (401). This leads to a housing fluid supply port (406). This port (406) comprises a channel extending about sufficient of the inner face of the housing (401) so that it can overlap with a distributor fluid inlet port (407) when the distributor (400) is in its alternate positions of FIGS. 4a and 4b. The port (406) is an elongated vertically machined channel, so that the ports (406, 407) overlap during the entire distance of linear motion of the distributor (400). The inlet port (407) is connected to fluid distribution port (408) which feeds to output conduit (409) and associated port (410).

During the linear motion of the distributor (400), the port (410) will at different periods during the linear motion, overlap with different independent circuit conduit ports—when rotated into the position of FIG. 4a, it will feed the left hand independent circuit conduit ports (411, 412) while in the position of FIG. 4b it will feed port (414). The distributor port (410) and/or the housing ports (411, 412, 414) may each be simple circular apertures, be elongated, be channels, or adopt various configurations as previously discussed herein.

The drawing is two dimensional, though it should be appreciated that there may be more than one radially directed arms on the conduit (409) leading to ports in the housing, though the arrangement is such that they will typically be divided into sets (with a port belonging to one or more sets) so that a set of ports will be associated with each position of the distributor (such as illustrated by way of example in FIGS. 4a and 4b).

EXAMPLE 4

Figure 5:
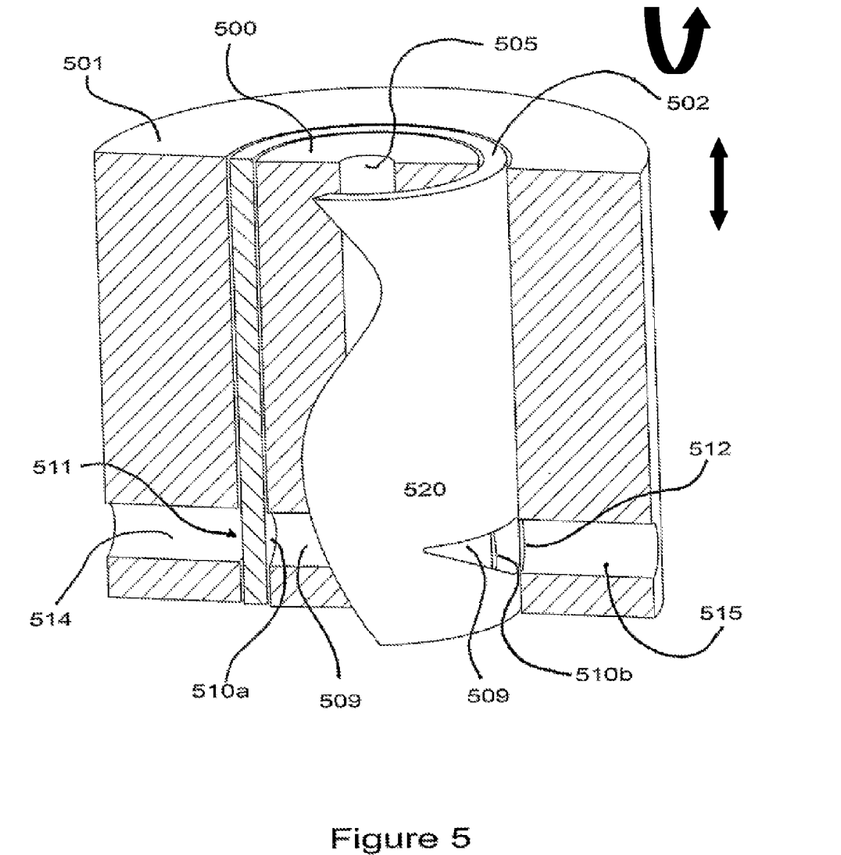
FIG. 5 is a partial cross-sectional side view showing an embodiment where a rotating sleeve/shutter arrangement is used, and FIGS. 6a, b are top cross-sectional views of an embodiment with a rotating central distributor, and a rotationally repositionable sleeve to switch between different output modes.

FIG. 5 illustrates an embodiment in which opening and closing of opposing ports in a distributor (500) and housing (501) is controlled by a rotating shutter arrangement comprising a sleeve (502). A very simple embodiment is shown for clarity, though more complex arrangements with additional port combinations (at different radial positions and/or axially displaced positions) can be constructed and are within the scope of this invention.

At the top of the distributor (500) is provided a connection (not shown) to the fluid input conduit (505). This leads to distributor output conduits (509) and their associated port apertures (510a, 510b). These oppose apertures (511, 512) in the housing (501) associated with independent circuit conduits (514, 515) to which fluid driven devices may be connected.

In this embodiment, both the distributor (500) and housing (501) are stationary. Each opposing aperture set (510a and 511) and (510b and 512) are opened and closed by the rotational position of the sleeve (502). Apertures (520) in the sleeve allow for connection between the aperture sets (510a and 511) and (510b and 512) as they rotate past. Multiple apertures (520) may be provided, though it is desirable that only one aperture set (associated with a single inlet conduit (505) is open at any one time—except where overlap during closing and opening is provided. Hence a particular housing port may be fed only once per revolution of the sleeve (502) or a plurality of sleeve apertures (520) may be provided to enable it to be fed many times per revolution. Again, user choice exists in this regard.

EXAMPLE 5

Figure 6A:
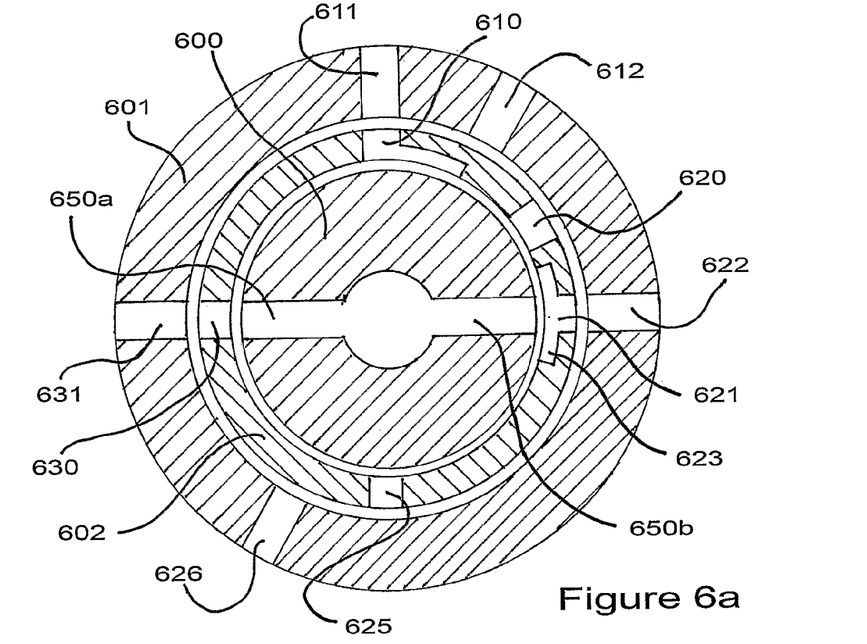
Figure 6B:
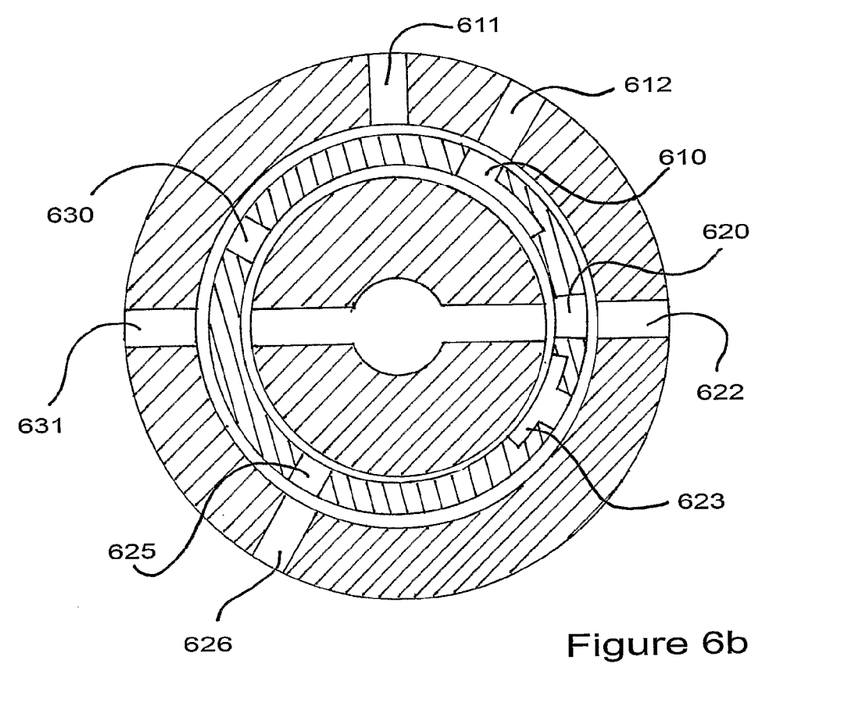

This illustrates a further variation in which there is a rotating distributor (600) within an outer housing (601)—see FIG. 6. Between the distributor (600) and housing (601) is a sleeve (602) which can be locked into two rotational positions. For this embodiment the sleeve (602) can be locked in a first rotational position (relative to the stationary housing (602) as shown in FIG. 6a. In the second position, it (602) is locked in a second position which is approximately 30° clockwise to that of position 1. Position 2 is illustrated in FIG. 6b.

When in position 1, certain apertures in the sleeve (602) line up with apertures in the housing (601). For instance, aperture (610) lines up with the aperture for conduit (611) when in position 1 (FIG. 6a), but not in position 2 whereupon it lines up with the aperture for conduit (612) instead—see FIG. 6b.

Aperture (621) lines up with the aperture for conduit (622) when in position 1 (and aperture (620) doesn't) while, when in position 2, it is aperture (620) which instead lines up with the aperture for conduit (622). Of note is that apertures (620) and (621) are of different configurations—the inner side of aperture (621) has a larger opening (623) than that of aperture (620). This means that aperture (621) is open to the fluid delivery ports (650a, b) on the distributor for a greater rotational period, meaning that more fluid is delivered to conduit (622)—volume is proportional to time open. Hence, the user can select, by moving the sleeve, different opening durations and flow profiles for a particular output conduit (e.g. 622).

In position 1 the aperture (625) is closed, but is open to the aperture of conduit (626) in position 2—thereby providing a simple on-off mechanism for a conduit.

In contrast, aperture (630) is open to conduit (631) in position 1, but closed in position 2).

As can be appreciated, a sleeve may be movable between more than one rotational position. The main limiting factors will be port size, and the number of ports radially distributed about the housing.

The same principles can also be applied in a sleeve which can attain one or more positions by linear sliding rather than by rotation. Hence, moving from position 1 to position 2 may involve sliding the sleeve linearly and thereby exposing a separate set of apertures to conduit ports in the distributor (600) and housing (601). Again, more than two possible positions can be provided. The linear arrangement can be more suitable when the housing is quite crowded radially, such that it is difficult to implement a rotationally repositionable control sleeve (602). More complex arrangements with both linear and rotationally repositionable control sleeves (602) are also envisaged.

Aspects of the present invention have been described by way of example only and it should be appreciated that modifications and additions may be made thereto without departing from the spirit or scope of the present invention as described herein.

It should also be understood that the term "comprise" where used herein is not to be considered to be used in a limiting sense. Accordingly, 'comprise' does not represent nor define an exclusive set of items, but includes the possibility of other components and items being added to the list.

This specification is also based on the understanding of the inventor regarding the prior art. The prior art description should not be regarded as being authoritative disclosure on the true state of the prior art but rather as referencing considerations brought to the mind and attention of the inventor when developing this invention, and neither does it represent any admission or indication of prior art publicly available in any jurisdiction.

The claims defining the invention are:

1. A fluid flow divider comprising:
a central distributor having axial length;
an outer distribution housing;
a movable shutter element operative to provide relative motion to the central distributor and outer distribution housing by a periodic linear sliding movement,
the central distributor being positioned within the movable shutter element, the movable shutter element in turn positioned within the outer distribution housing,
the central distributor having outwardly directed radial output conduits from a fluid input each extending to an opening on the outside surface of the central distributor, and which align with facing openings on independent circuit conduits in the outer distribution housing;
said movable shutter element including conduit flow apertures therein, positioned such that linear movement of the intervening, movable shutter element, relative to said central distributor and outer distribution housing during operation of the fluid flow divider, periodically opens and obscures said aligned facing openings, of said central distributor output conduits and said circuit conduits of the outer distribution housing, to control the communication and flow of fluid between said aligned openings,
each independent circuit conduit leading to an outer surface of the distribution housing for connection to a circuit requiring a divided flow output; and
a provision for connection of a fluid input to an input conduit of the central rotating distributor.

2. A fluid flow divider as claimed in claim 1 in which there are a plurality of movable shutter elements, each with at least one conduit flow aperture and movable by a periodic linear sliding movement to open or block fluid flow between an independent circuit conduit and an output conduit of the central distributor.

3. A fluid flow divider as claimed in claim 1 in which the periodic linear sliding movement of a movable shutter element is controlled by a rotating cam arrangement.

4. A fluid flow divider as claimed in claim 1 in which the closing of an output conduit to an independent circuit conduit overlaps with the opening of an output conduit to an independent circuit conduit.

5. A fluid flow divider as claimed in claim 4 in which, at all times during normal operation, the axial conduit of the central distributor is, via the output conduits, at least partially open to one or more independent circuit conduits.

6. A fluid flow divider as claimed in claim 1 in which either or both of i) the opening of an output conduit to an independent circuit conduit, or ii) the closing of an output conduit to an independent circuit conduit, is progressive.

7. A fluid flow divider as claimed in claim 6 in which the progressive opening and/or closing is achieved by modifying the shape of one or more of the openings which overlap to affect opening and closing of an output conduit to an independent circuit conduit and in which either or both of a leading edge, or trailing edge, of an opening is shaped according to one or more of the following configurations: teardrop, triangular, oval, circular, parabolic, crescent shaped, or a complex shape made up of a combination of one or more of the preceding shapes.

8. A fluid flow divider as claimed in claim 1 in which there are multiple output conduits in the central distributor which are arranged in a radial pattern and distributed, either regularly or non-regularly, substantially within the same radial plane.

9. A fluid flow divider as claimed in claim 1 in which there are multiple output conduits which are arranged radially in different radial planes, a radial plane being a plane perpendicular to the rotational axis of the central rotating distributor.

10. A fluid flow divider as claimed in claim 1 in which an input conduit on the central distributor ports to an axial surface of the central rotating distributor, an axial surface being a surface (or part of a complex surface) through which the rotational axis of the distributor passes.

11. A fluid flow divider as claimed in claim 1 in which there are fluid check valves associated with one or more independent circuit conduits.

12. A fluid flow divider as claimed in claim 1 further comprising a repositionable control sleeve between the central distributor and housing, and in which the repositionable control sleeve is able to be positioned between a number of pre-selected positions, and held in a said position during operation of the fluid flow divider;
and wherein, said repositionable control sleeve possesses apertures therein which, when in different pre-selected positions, interact with either or both of at least one aperture port of the output conduit(s), or at least one aperture port of an independent circuit conduit of the housing, such that the flow of fluid between said aperture ports from operation of a said movable shutter element is controlled according to at least one of:
closing off a said aperture during operation of the fluid flow divider, opening up a said aperture during operation of the fluid flow divider, and increasing the effective duration of opening of aperture during operation of the fluid flow divider.

13. A fluid flow divider comprising a central distributor having axial length, the central distributor including an axial conduit connecting at least two axially separated radial conduits extending to an outside surface of the distributor;
at least one of said radial conduits being an input conduit and the other(s) being output conduit(s);
the central distributor being positioned within an outer distribution housing, the outer distribution housing having a plurality of independent circuit conduits positioned such that periodically during operation of the fluid flow divider, they are open to communication with an output conduit of the central distributor for an interval of time;

each independent circuit conduit leading to an outer surface of the distribution housing for connection to a circuit requiring a divided flow output;

there also being provision for the connection of a fluid input to an input conduit of the central rotating distributor, in which the opening of an independent circuit conduit to an output conduit of the central distributor is achieved by a shutter arrangement between facing openings of said conduits, said shutter arrangement comprising a movable shutter element with a conduit flow aperture positioned such that movement of the movable shutter element allows said conduit flow aperture to be positioned to either allow the flow of fluid between said conduits, or to block fluid flow between said conduits, in which the movable shutter element comprises a sleeve positioned between the central distributor and the outer distribution housing, in which the movable shutter element is capable of relative motion to the central distributor and outer distribution housing by either or both of i) rotation, or ii) a periodic linear sliding movement, and in which the periodic linear sliding movement of a movable shutter element is controlled by a rotating cam arrangement.

14. A fluid flow divider comprising a central distributor having axial length, the central distributor including an axial conduit connecting at least two axially separated radial conduits extending to an outside surface of the distributor;

at least one of said radial conduits being an input conduit and the other(s) being output conduit(s);

the central distributor being positioned within an outer distribution housing, the outer distribution housing having a plurality of independent circuit conduits positioned such that periodically during operation of the fluid flow divider, they are open to communication with an output conduit of the central distributor for an interval of time;

each independent circuit conduit leading to an outer surface of the distribution housing for connection to a circuit requiring a divided flow output;

there also being provision for the connection of a fluid input to an input conduit of the central rotating distributor, in which the closing of an output conduit to an independent circuit conduit overlaps with the opening of an output conduit to an independent circuit conduit.

* * * * *

UNITED STATES PATENT AND TRADEMARK OFFICE
CERTIFICATE OF CORRECTION

PATENT NO. : 8,567,439 B2 Page 1 of 1
APPLICATION NO. : 12/531334
DATED : October 29, 2013
INVENTOR(S) : Rodney Warwick Sharp It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 952 days.

Signed and Sealed this
Fifteenth Day of September, 2015

Michelle K. Lee
*Director of the United States Patent and Trademark Office*